United States Patent
Ni et al.

(10) Patent No.: US 11,076,111 B1
(45) Date of Patent: Jul. 27, 2021

(54) SMART COLOR-BASED BACKGROUND REPLACEMENT

(71) Applicant: Twitch Interactive, Inc., San Francisco, CA (US)

(72) Inventors: Kevin M. Ni, San Francisco, CA (US); Jackson Gardner, Oakland, CA (US); Charles Bradford, Irvine, CA (US); Sean Stanek, Irvine, CA (US); Ross Alan Cameron Gardner, Irvine, CA (US); Tyler McDowall, Laguna Hills, CA (US); Phillip Carter, Lake Forest, CA (US); Furqan Rydhan, San Francisco, CA (US); Florian Patrick Nierhaus, San Francisco, CA (US); Sang Jin Lee, San Francisco, CA (US)

(73) Assignee: Twitch Interactive, Inc., San Francisco, CA (US)

(*) Notice: Subject to any disclaimer, the term of this patent is extended or adjusted under 35 U.S.C. 154(b) by 0 days.

(21) Appl. No.: 16/682,994

(22) Filed: Nov. 13, 2019

(51) Int. Cl.
- *H04N 5/272* (2006.01)
- *G06T 7/90* (2017.01)
- *G06K 9/62* (2006.01)

(52) U.S. Cl.
CPC .......... *H04N 5/272* (2013.01); *G06K 9/6215* (2013.01); *G06K 9/6218* (2013.01); *G06T 7/90* (2017.01); *G06T 2207/10016* (2013.01); *G06T 2207/10024* (2013.01); *G06T 2207/20021* (2013.01); *G06T 2207/20072* (2013.01)

(58) Field of Classification Search
CPC ............ G06T 7/90; G06T 2207/10016; G06T 2207/10024; G06T 2207/20021; G06T 2207/20072; G06K 9/6215; G06K 9/6218
See application file for complete search history.

(56) References Cited

U.S. PATENT DOCUMENTS

| | | | |
|---|---|---|---|
| 6,999,620 B1* | 2/2006 | Harville | G06K 9/00362 382/103 |
| 8,405,780 B1* | 3/2013 | Schaem | H04N 9/75 348/576 |
| 9,152,878 B2* | 10/2015 | Dai | G06K 9/4652 |
| 9,247,155 B2* | 1/2016 | Gupta | H04N 5/2621 |
| 9,514,540 B2* | 12/2016 | Wang | G06T 11/60 |
| 9,542,735 B2* | 1/2017 | Shukla | H04N 5/23216 |
| 9,781,308 B2* | 10/2017 | Sawada | H04N 1/4074 |
| 10,152,645 B2* | 12/2018 | Baltsen | G06K 9/00718 |
| 2003/0011609 A1* | 1/2003 | Deering | G06T 1/20 345/582 |

(Continued)

*Primary Examiner* — Brian P Yenke

(74) *Attorney, Agent, or Firm* — BakerHostetler

(57) ABSTRACT

A streaming application setup assistant may receive an image captured by a camera, the image capturing a physical environment that is to be part of a live video stream. A plurality of pixels may be selected from the image. The plurality of pixels may be grouped, based on a pixel color value for each pixel, into a plurality of pixel groups. A key pixel color value may be calculated that is associated with an average pixel color value of pixels in a largest pixel group of the plurality of pixel groups. A similarity color range that encompasses a threshold percentage of the pixels in the largest pixel group may be identified based on the key pixel color value. The similarity color range may be utilized to configure settings for replacement of the background in the live video stream.

20 Claims, 7 Drawing Sheets

(56) References Cited

U.S. PATENT DOCUMENTS

| | | | | |
|---|---|---|---|---|
| 2005/0151850 A1* | 7/2005 | Ahn | ............... | G06F 3/017 |
| | | | | 348/207.99 |
| 2006/0109285 A1* | 5/2006 | Chan | ............... | G09G 5/14 |
| | | | | 345/642 |
| 2007/0273765 A1* | 11/2007 | Wang | ............... | G06K 9/00771 |
| | | | | 348/152 |
| 2008/0152236 A1* | 6/2008 | Vendrig | ............... | G06K 9/38 |
| | | | | 382/224 |
| 2011/0001840 A1* | 1/2011 | Ishii | ............... | G06T 1/0007 |
| | | | | 348/222.1 |
| 2011/0038535 A1* | 2/2011 | Wang | ............... | H04N 9/735 |
| | | | | 382/164 |
| 2011/0043699 A1* | 2/2011 | Springett | ............... | G06K 9/00771 |
| | | | | 348/571 |
| 2011/0150280 A1* | 6/2011 | Tsuji | ............... | G06T 7/248 |
| | | | | 382/103 |
| 2012/0020553 A1* | 1/2012 | Pettigrew | ............... | G06T 11/001 |
| | | | | 382/164 |
| 2012/0128248 A1* | 5/2012 | Hamada | ............... | G06T 7/194 |
| | | | | 382/173 |
| 2012/0183177 A1* | 7/2012 | Ku | ............... | G06K 9/00771 |
| | | | | 382/103 |
| 2012/0327172 A1* | 12/2012 | El-Saban | ............... | G06K 9/00664 |
| | | | | 348/14.02 |
| 2013/0002865 A1* | 1/2013 | Pakulski | ............... | G06K 9/3241 |
| | | | | 348/143 |
| 2013/0101208 A1* | 4/2013 | Feris | ............... | G06K 9/00771 |
| | | | | 382/164 |
| 2013/0170742 A1* | 7/2013 | Dai | ............... | G06T 7/194 |
| | | | | 382/164 |
| 2013/0202158 A1* | 8/2013 | Nakao | ............... | G06T 7/248 |
| | | | | 382/107 |
| 2014/0056519 A1* | 2/2014 | Gupta | ............... | G06T 7/194 |
| | | | | 382/173 |
| 2015/0221066 A1* | 8/2015 | Kobayashi | ............... | G06T 11/00 |
| | | | | 382/284 |
| 2015/0248590 A1* | 9/2015 | Li | ............... | G06K 9/00785 |
| | | | | 382/103 |
| 2017/0103547 A1* | 4/2017 | Guo | ............... | G06K 9/6215 |
| 2017/0116404 A1* | 4/2017 | Birk | ............... | G06K 9/00604 |
| 2019/0379873 A1* | 12/2019 | Collet Romea | ............... | H04N 5/272 |
| 2021/0027497 A1* | 1/2021 | Ding | ............... | G06T 7/90 |

* cited by examiner

510 Receive, by a streaming application setup assistant, an image captured by a camera, the image capturing a physical environment that is to be part of a live video stream

512 Determine a similarity color range of a background of the image

512A Select a plurality of pixels from the image, wherein the plurality of pixels represents a proper subset of all pixels included in the image

512B Determine a pixel color value for each pixel included in the plurality of pixels

512C Group, based on the pixel color value for each pixel, the plurality of pixels into a plurality of pixel groups

512D Select a largest pixel group of the plurality of pixel groups

512E Calculate a key pixel color value that is associated with an average pixel color value of pixels in the largest pixel group

512F Identify the similarity color range, based on the key pixel color value, that encompasses a first threshold percentage of the pixels in the largest pixel group

514 Utilize the similarity color range to configure settings for replacement of the background in the live video stream

FIG. 5

SMART COLOR-BASED BACKGROUND REPLACEMENT

BACKGROUND

The widespread use of video streaming has increased rapidly in recent years. A streamer, as used herein, refers to a user that provides video content that is streamed to viewers. In some examples, a streamer may capture video content and transmit the video content to a video streaming service. The video streaming service may then, in turn, transmit the video to a number of viewers. In some examples, a streamer may capture, using a webcam or other camera, video of himself or herself for transmission to viewers. Also, in some examples, the streamer may wish to replace a background of the video with other visual content that is superimposed onto the background, such as various, images, graphics, and the like. This may allow for creation of video in which the streamer appears to be standing or otherwise positioned in front of the superimposed background content. In some examples, a color-based background replacement technique, such as chroma keying, may be employed to easily detect and remove the background of the image. For example, by having a user stand in front of a background with a uniform color, the background may be easy to distinguish from the user's face and/or body in the image foreground. This may enable the background to be easily detected and removed. In some examples, green or blue backgrounds may be commonly used because they may offer a strong contrast with the color of human skin. While these color-based techniques may allow backgrounds to be efficiently detected and removed, they may sometimes be inconvenient to users because they may involve manual configuration of a number of settings, which may be time-consuming and confusing for users, and particularly for users without detailed knowledge of the technical requirements of these color-based techniques.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a flowchart illustrating an example process for smart color-based background replacement that may be used in accordance with the present disclosure.

DETAILED DESCRIPTION

Figure 1:
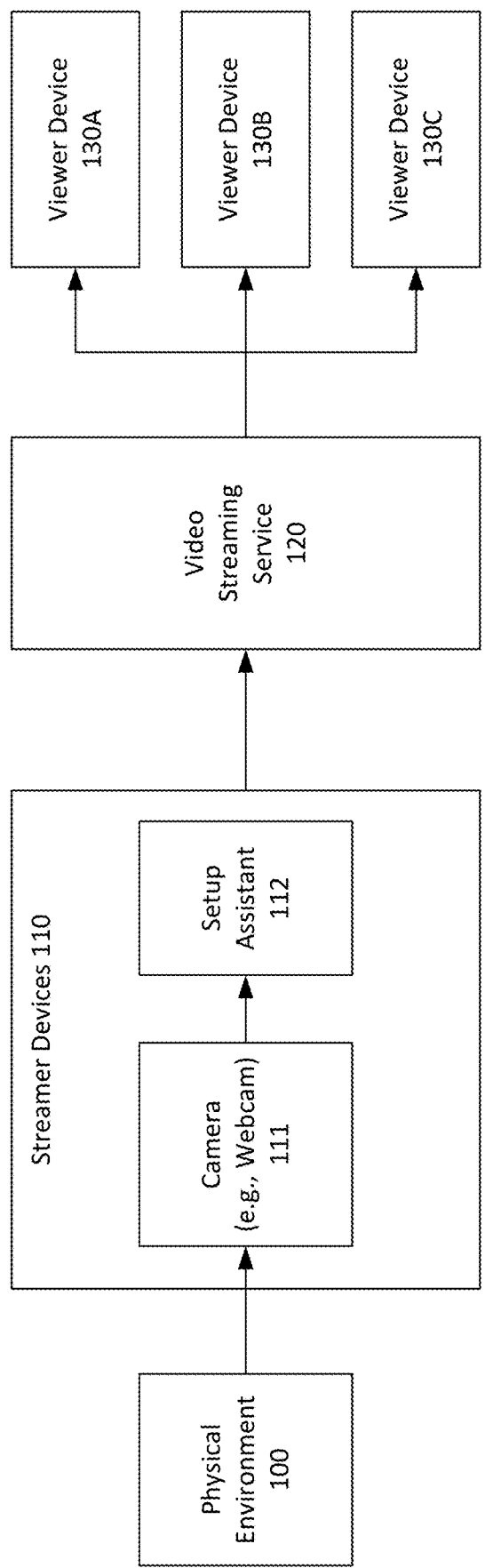
FIG. 1 is a diagram illustrating an example system for smart color-based background replacement that may be used in accordance with the present disclosure.

Techniques for smart color-based background replacement are described herein. In particular, in some examples, video of a physical environment may be captured using a camera, such as a webcam. In some examples, a streamer may capture video content and transmit the video content to a video streaming service. The video streaming service may then, in turn, transmit the video to a number of viewers. In some examples, the video content may be transmitted to viewers and played using live streaming techniques. For example, video content of an event (e.g., a streamer speaking in front in a webcam) may be transmitted to viewers, and at least part of the video content may be played while the event is still occurring (e.g., while the streamer is continuing to speak in front of the webcam), albeit with some small amounts latency between the time that video content is captured by the streamer and the time that the video is eventually played to viewers.

The images within the video may include one or more foreground objects, such as a streamer's face and/or body, positioned in front of a background. In some examples, a streamer may wish to replace the background of the video with other visual content that is superimposed onto the background, such as various, images, graphics, and the like. This may allow for creation of video in which the streamer appears to be standing or otherwise positioned in front of the superimposed background content. In some examples, a color-based background replacement technique, such as chroma keying, may be employed to easily detect and remove the background of the image. For example, by having a user stand in front of a background with a uniform color, the background may be easy to distinguish from the user's face and/or body in the image foreground. This may enable the background to be easily detected and removed and replaced with other visual content.

As described in detail below, in some examples, the video may be provided to a streaming application setup assistant, which may be a software component that performs various actions to automatically configure settings for replacement of the background in the video stream. For example, in some cases, the setup assistant may automatically determine when to perform background replacement, such as based on a degree of uniformity of the coloring of the background in the video. Additionally, in some examples, the setup assistant may automatically determine a key color associated with the background. Furthermore, in some examples, the setup assistant may automatically determine a similarity color range associated with the key color, whereby the key color and the associated similarity color range are used for detection and replacement of the background. By automatically configuring these and other settings, the setup assistant may provide a number of advantages over manual configuration systems. For example, the setup assistant may reduce the time and complexity required for streaming configuration, thereby improving efficiency, particularly for streamers that lack detailed technical knowledge of background replacement techniques. For example, some streamers may not know the exact color of an image background that is being used. Additionally, streamers may not know or understand what a similarity color range is—or may not understand which similarity color range may be used to provide favorable results in a given streaming scenario. Moreover, it is noted that these and other settings may sometimes change drastically depending upon a streamer's webcam and lighting.

In some examples, upon receiving an image within the captured video, the setup assistant may perform operations to determine a similarity color range of a background of the image. Specifically, the setup assistant may select (e.g., sample) a plurality of pixels from the image. The selected plurality of pixels may represent a proper subset of all pixels included in the image. In some examples, the image may include a first portion and a second portion, and the plurality of pixels may be sampled from the first portion and not the second portion. In one specific example, the first portion of the image may include a right portion of the image and a left portion of the image, while the second portion of the image may include a center portion of the image. Also, in one specific example, the right portion, the left portion and the center portion of the image may each be equivalently sized. Selecting the plurality of pixels from the right potion and the left portion (and not the center portion) may often be advantageous because the streamer may often be positioned in the center of the image, meaning that the left and right portions are more likely to include the background. In some examples, the plurality of pixels may be selected from the image based on an equal distribution of pixels in the first portion of the image. For example, the plurality of pixels may include equal amounts of pixels from both the right portion and the left portion of the image. As another example, the plurality of pixels may be equally distributed across an area of the first portion (e.g., across areas of each the right portion and the left portion), equidistantly distributed, and/or may otherwise be selected from the image based on an equal distribution of pixels in the first portion of the image. In one specific example, each pixel of the plurality of pixels may be substantially equidistant from each of at least two other pixels in the plurality of pixels.

A pixel color value may then be determined for each pixel included in the plurality of pixels. For example, the image that is received from the camera may include, or may otherwise be associated with, data that identifies pixel color values for each of the pixels included in the image, and the pixel color values may be determined based on this color value data. The plurality of pixels may then be grouped, based on the pixel color value for each pixel, into a plurality of pixel groups. In some examples, the pixel color value for a respective pixel of the plurality of pixels that is used for the grouping may be independent of a luminance value for the respective pixel. For example, the pixel color value for a respective pixel of the plurality of pixels that is used for the grouping may include blue chrominance (U) and red chrominance (V) values of a luminance-blue chrominance-red chrominance (YUV) color model. In some examples, the luminance (Y) value of the YUV color space may not be used to group the pixels. This may be because the luminance of a background may vary depending upon various factors that are independent of the background's true intrinsic color. These may include factors such as an angle at which light emitted by light sources hits the background within the captured image. Thus, in some examples, discarding of the Y (luminance) value for grouping of the plurality of pixels may provide more accurate or advantageous results. It is noted that, as an alternative or in addition to YUV, other color models may also be employed, such as red-green-blue (RGB), hue-saturation-lightness (HSL), hue-saturation-value (HSV), hue-saturation-intensity (HSI), and others. In some examples, the pixels may be grouped by dividing a graph of pixel color values into a plurality of areas representing the plurality of pixel groups. For example, in the case of YUV color, blue chrominance (U) and red chrominance (V) values may be plotted on a graph with one axis (e.g., an X or horizontal axis) representing blue chrominance (U) values and another axis (e.g., an Y or vertical axis) representing red chrominance (V) values (with luminance values being discarded as described above). In one specific example, such a graph could be divided into a selectable number of areas representing the plurality of pixel groups. Each pixel may then be included in the pixel group represented by the area in which the pixel's respective pixel value is plotted. Other techniques may also be employed to group the pixels, such as based on one or more clustering algorithms (e.g., centroid-based clustering) and the like.

Upon grouping of the plurality of pixels, the largest pixel group (i.e., the pixel group that includes the most pixels) may be selected. A key pixel color value may then be calculated based on the pixel color values of the pixels in the largest pixel group. For example, the key pixel color value may be associated with an average pixel color value of pixels in the largest pixel group. In some examples, the key pixel color value may be the average pixel color value of pixels in the largest pixel group. In other examples, the key pixel color value may otherwise be calculated based on (e.g., as a factor of) the average pixel color value. The similarity color range may then be identified based on the key pixel color value. In some examples, the similarity color range may be identified based on a Euclidean distance from the key pixel color value that encompasses the threshold percentage of the pixels in the largest pixel group. For example, in the graph of UV color values described above, a point representing the key pixel color value may form a center point of a circle. The circle may be formed based on (e.g., so that it is just large enough to encompass) the threshold percentage of the pixels in the largest pixel group. The similarity color range may then include the color values that are represented by the area of the circle within the graph. It is noted that, in addition or as alternative to Euclidean distance, other distance measures may be also be used to determine the similarity color range. The key pixel color value and the similarity color range may then be utilized to configure settings for replacement of the background in the live video stream. For example, the key pixel color value may be used as a color setting and the similarity color range may be used as a similarity setting for performing background replacement. For example, in some cases, each pixel in the image that has a color value within the similarity color range may be considered to be part of the background and may be removed. In some cases, not all pixels within the similarity color range may be removed, such as if they are positioned in an area of an image that has otherwise been determined not to be part of the background.

Thus, the above techniques may be used to configure settings for replacement of the background. In some examples, a user may provide a command or other instructions to trigger an initiation of the background replacement process. It is noted, however, that the techniques described herein may allow the background replacement process to be automatically triggered, without first requiring an explicit user command or instruction to trigger the process. For example, in some cases, the setup assistant may determine, based on a degree of uniformity of the background color, that the user would like the background replacement process to be automatically triggered. For example, when a user's face is positioned in front of a background with a substantially uniform color, this may be considered a strong indication that the streamer would like a chroma-keying or other background replacement process to be performed. In some examples, the setup assistant may examine the size (e.g. number of pixels) in the largest pixel group described above. When the largest pixel group includes at least a selected threshold percentage of the subset of sampled pixels, then this may be a strong indication that the background has a substantially uniform color—and that the streamer would like a chroma-keying or other background replacement process to be performed. In one specific example, a threshold percentage of at least fifty percent of the sampled pixels may be selected. In some examples, if the largest pixel group meets or exceeds this threshold percentage, then the setup assistant may automatically trigger performance of a background replacement process—or in some cases may ask the streamer to confirm that he or she would like the background replacement processes to be triggered.

FIG. 1 is a diagram illustrating an example system for smart color-based background replacement that may be used in accordance with the present disclosure. In particular, in some examples, video of a physical environment 100 may be captured using a camera 111, such as a webcam, included in one or more streamer devices 110 operated by a streamer. In some examples, the streamer may capture video content and transmit the video content from the streamer (i.e., from the streamer devices 110) to a video streaming service 120. The video streaming service 120 may then, in turn, transmit the video to a number of viewers 130A-C. The video content may be transmitted from the streamer to video streaming service 120 and, in turn, from video streaming service 120 to viewers 130A-C over one or more communications networks, for example one or more local area networks (LAN's) and/or one or more wide area networks (WAN's), such as the Internet. Additionally, video content may be transmitted from the streamer to video streaming service 120 and, in turn, from video streaming service 120 to viewer devices 130A-C using streaming transmission techniques, in which portions of transmitted content are received and played while subsequent portions of the transmitted content are being transmitted. In some examples, the video content may be transmitted to viewers 130A-C and played using live streaming techniques. For example, video content of an event (e.g., a streamer speaking in front in a webcam) may be transmitted to viewers 130A-C, and at least part of the video content may be played while the event is still occurring (e.g., while the streamer is continuing to speak in front of the webcam), albeit with some small amounts latency between the time that video content is captured by the streamer and the time that the video is eventually played to viewers 130A-C.

The images captured from the physical environment 100 may include one or more foreground objects, such as a streamer's face and/or body, positioned in front of a background. In some examples, a streamer may wish to replace the background of the video with other visual content that is superimposed onto the background, such as various, images, graphics, and the like. This may allow for creation of video in which the streamer appears to be standing or otherwise positioned in front of the superimposed background content. In some examples, a color-based background replacement technique, such as chroma keying, may be employed to easily detect and remove the background of the image. For example, by having a user stand in front of a background with a uniform color, the background may be easy to distinguish from the user's face and/or body in the image foreground. This may enable the background to be easily detected and removed and replaced with other visual content. As described in detail below, in some examples, the video may be provided to a setup assistant 112, such as a streaming application set assistant, which may also be executed at streamer devices 110. In some examples, the setup assistant 112 may be provided by the video streaming service 120, for example as part of a client application provided by video streaming service 120. In the example of FIG. 1, the setup assistant 112 executes locally at streamer devices 110. However, in other examples, the setup assistant 112 may be executed by one or more computing devices remote from the streamer, such as by video streaming service 120 or by another cloud or remote computing service. In yet other examples, execution of the setup assistant 112 may be distributed between the streamer devices 110 and one or more remote devices. The setup assistant 112 may be a software component that performs various actions to automatically configure settings for replacement of the background in the video stream. For example, in some cases, the setup assistant 112 may automatically determine when to perform background replacement, such as based on a degree of uniformity of the coloring of the background in the video. Additionally, in some examples, the setup assistant 112 may automatically determine a key color associated with the background. Furthermore, in some examples, the setup assistant 112 may automatically determine a similarity color range associated with the key color, whereby the key color and the associated similarity color range are used for detection and replacement of the background.

Figure 2:
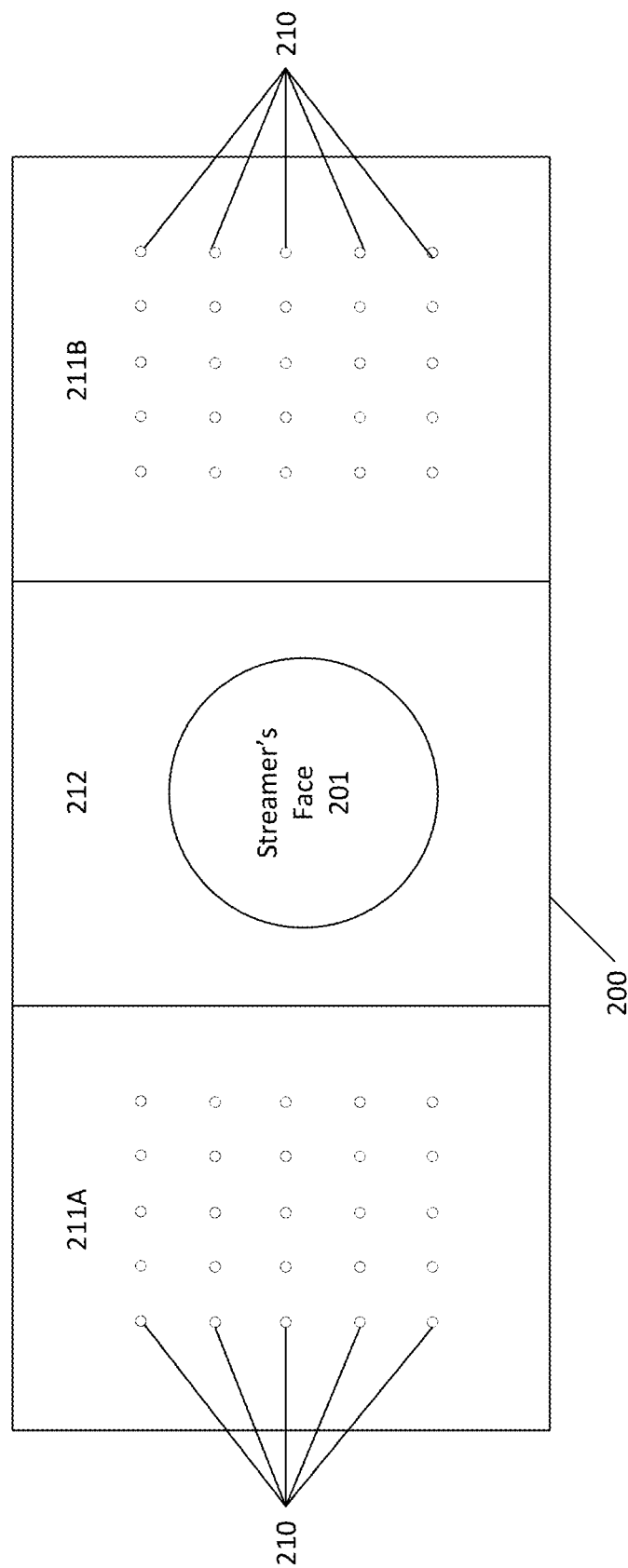
FIG. 2 is a diagram illustrating an example sampling of a subset of pixels in an image that may be used in accordance with the present disclosure.

The setup assistant 112 may perform operations to identify a background color range of an image in the video of the physical environment 100. Specifically, the setup assistant 112 may select (e.g., sample) a plurality of pixels from the image. The selected plurality of pixels may represent a proper subset of all pixels included in the image. Referring now to FIG. 2, an example sampling of a subset of pixels in an image will now be described in detail. Specifically, as shown in FIG. 2, a plurality of pixels 210 may be selected (e.g., sampled) from an image 200 that represent a proper subset of all pixels included in the image 200. In the example of FIG. 2, the plurality of pixels 210 (represented by black dots in FIG. 2) include each of the five pixels on each of the five rows of pixels in both a left portion 211A and a right portion 211B of image 200. In the example of FIG. 2, the image 200 includes a first portion (including both left portion 211A and right portion 211B) and a second portion (including a center portion 212), and the plurality of pixels 210 are sampled from the first portion and not the second portion. As shown in FIG. 2, the center portion 212 includes the streamer's face 201. In some examples, the right portion 211B, the left portion 211A and the center portion 212 of the image 200 may each be equivalently sized. Selecting the plurality of pixels 210 from the right potion 211B and the left portion 211A (and not the center portion 212) may often be advantageous because the streamer may often be positioned in the center of the image (as shown in image 200), meaning that the left and right portions 211A and 211B are more likely to include the background. In some examples, the plurality of pixels 210 may be selected from the image 200 based on an equal distribution of pixels in the first portion of the image 200. For example, the plurality of pixels may include equal amounts of pixels from both the right portion 211B and the left portion 211A of the image 200 (as shown in FIG. 2). As another example, the plurality of pixels 210 may be equally distributed across an area of the first portion (e.g., across areas of each the right portion 211B and the left portion 211A), equidistantly distributed, and/or may otherwise be selected from the image 200 based on an equal distribution of pixels in the first portion of the image 200. In one specific example, each pixel of the plurality of pixels 210 may be substantially equidistant from each of at least two other pixels in the plurality of pixels 210 (as shown in FIG. 2).

A pixel color value may then be determined for each pixel included in the plurality of pixels. For example, the image 200 that is received from the camera 111 may include, or may otherwise be associated with, data that identifies pixel color values for each of the pixels included in the image, and the pixel color values may be determined based on this color value data. The plurality of pixels 210 may then be grouped, based on the pixel color value for each pixel, into a plurality of pixel groups. In some examples, the pixel color value for a respective pixel of the plurality of pixels 210 that is used for the grouping may be independent of a luminance value for the respective pixel. For example, the pixel color value for a respective pixel of the plurality of pixels 210 that is used for the grouping may include blue chrominance (U) and red chrominance (V) values of a luminance-blue chrominance-red chrominance (YUV) color model. In some examples, the luminance (Y) value of the YUV color space may not be used to group the plurality of pixels 210. This may be because the luminance of a background may vary depending upon various factors that are independent of the background's true intrinsic color. These may include factors such as an angle at which light emitted by light sources hits the background within the captured image 200. Thus, in some examples, discarding of the Y (luminance) value for grouping of the plurality of pixels 210 may provide more accurate or advantageous results. It is noted that, as an alternative or in addition to YUV, other color models may also be employed, such as red-green-blue (RGB), hue-saturation-lightness (HSL), hue-saturation-value (HSV), hue-saturation-intensity (HSI), and others.

Figure 3:
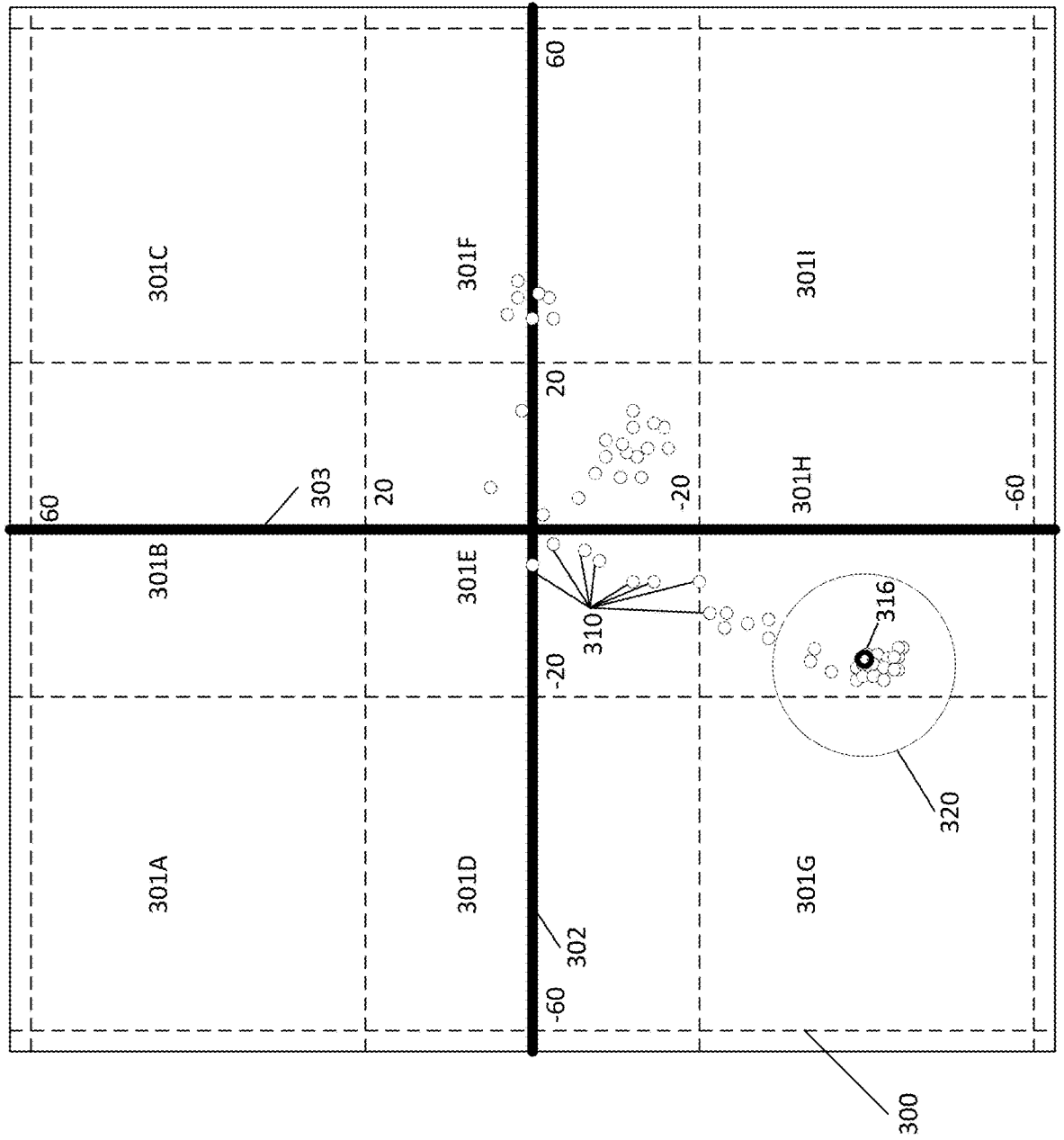
FIG. 3 is diagram illustrating example pixel color value groupings that may be used in accordance with the present disclosure.

Referring now to FIG. 3, some example groupings of the plurality of pixels 210 will now be described in detail. In the example of FIG. 3, the plurality of pixels 210 are grouped by dividing a graph 300 of pixel color values into nine areas 301A-I representing nine pixel groups. The graph 300 includes an X-axis 302 and a Y-axis 303. In the example of FIG. 3, blue chrominance (U) and red chrominance (V) values for the plurality of pixels are plotted on the graph 300 with the X-axis 302 representing blue chrominance (U) values and the Y-axis 303 representing red chrominance (V) values (with luminance values being discarded as described above). The graph 300 plots pixel color values 310 (shown by the dots in FIG. 3) for each of the plurality of pixels 210 at their respective blue chrominance (U) and red chrominance (V) values. In the example of FIG. 3, each of the nine areas 301A-I cover a respective forty-by-forty square of the graph 300 (as formed by the four horizontal dashed lines representing 60, 20, −20 and −60 on the Y-axis 303 and the four vertical dashed lines representing 60, 20, −20 and −60 on the X-axis 302). For example, area 301A covers a square that includes U values from −60 to −20 and V values from 60 to 20, area 301B covers a square that includes U values from −20 to 20 and V values from 60 to 20, area 301C covers a square that includes U values from 20 to 60 and V values from 60 to 20, area 301D covers a square that includes U values from −60 to −20 and V values from 20 to −20, area 301E covers a square that includes U values from −20 to 20 and V values from 20 to −20, area 301F covers a square that includes U values from 20 to 60 and V values from 20 to −20, area 301G covers a square that includes U values from −60 to −20 and V values from −20 to −60, area 301H covers a square that includes U values from −20 to 20 and V values from −20 to −60, and area 301I covers a square that includes U values from 20 to 60 and V values from −20 to −60. Each pixel in the plurality of pixels 210 may then be included in the pixel group represented by the area 301A-I in which the pixel's respective pixel value 310 is plotted. It is noted that, while the example of FIG. 3 includes nine square areas 301A-I, a graph may be divided into any number of areas having any number of shapes and/or sizes. Additionally, in some examples, pixel groupings may be dynamically updated or refined based on results of an initial grouping. For example, if it is determined that a large amount of pixels in two different pixel groups have similar color values that are adjacent to a border between the two different pixel groups, then the pixel groups may potentially be re-allocated to different areas of the graph, for example such that the large amount of pixels is re-allocated to only a single/group area as opposed to multiple groups/areas. Other techniques may also be employed to group the pixels, such as based on one or more clustering algorithms (e.g., centroid-based clustering) and the like. It is noted that, while FIGS. 2 and 3 depict examples in which only a subset of pixels in the image are sampled and grouped into pixels, the techniques described herein may also be used in scenarios in which all pixels in the image are grouped into pixel groups.

Upon grouping of the plurality of pixels 210 into pixel groups, the largest pixel group (i.e., the pixel group that includes the most pixels) may be selected. For example, as shown in FIG. 3, the pixel group represented by area 301H may be selected as the largest pixel group because area 301H includes the most pixel color values 310 of any of the areas 301A-H. A key pixel color value may then be selected. The key pixel color value may be associated with an average pixel color value of pixels in the largest pixel group. In some examples, the key pixel color value may be the average pixel color value of pixels in the largest pixel group. In other examples, the key pixel color value may otherwise be calculated based on (e.g., as a factor of) the average pixel color value. In the example of FIG. 3, a key pixel color value 316 is plotted on graph 300. The key pixel color value 316 is plotted at the location on 300 that represents the average value of all of the pixel color values 310 in the area 301H that represents the largest pixel group.

A similarity color range 320 may then be identified based on the key pixel color value 316. In some examples, the similarity color range 320 may be identified based on a Euclidean distance from the key pixel color value 316 that encompasses a threshold percentage of the pixels in the largest pixel group. For example, in the graph 300, the key pixel color value 316 forms a center point of a circle that represents the similarity color range 320. The circle may be formed based on (e.g., so that it is just large enough to encompass) the threshold percentage of the pixels in the largest pixel group. The similarity color range 320 may then include the color values that are represented by the area of the circle within the graph 300. For example, suppose that the threshold percentage is set to ninety-five percent. This means that the similarity color range 320 will be just large enough to include ninety-five percent of the plotted pixel color values 310 within the area 301H. If the threshold percentage is lowered, then the size of the similarity color range 320 may be reduced. If the threshold percentage is increased, then the size of the similarity color range 320 may be increased. It is noted that, in addition or as alternative to Euclidean distance, other distance measures may be also be used to determine the similarity color range 320.

The key pixel color value 316 and the similarity color range may then be utilized to configure settings for replacement of the background in the video stream. For example, the key pixel color value 316 may be used as a color setting and the similarity color range 320 may be used as a similarity setting for performing background replacement. For example, in some cases, each pixel in the image 200 that has a color value within the similarity color range 320 may be considered to be part of the background and may be removed. In some cases, not all pixels within the similarity color range may be removed, such as if they are positioned in an area of an image that has otherwise been determined not to be part of the background.

Figure 4:
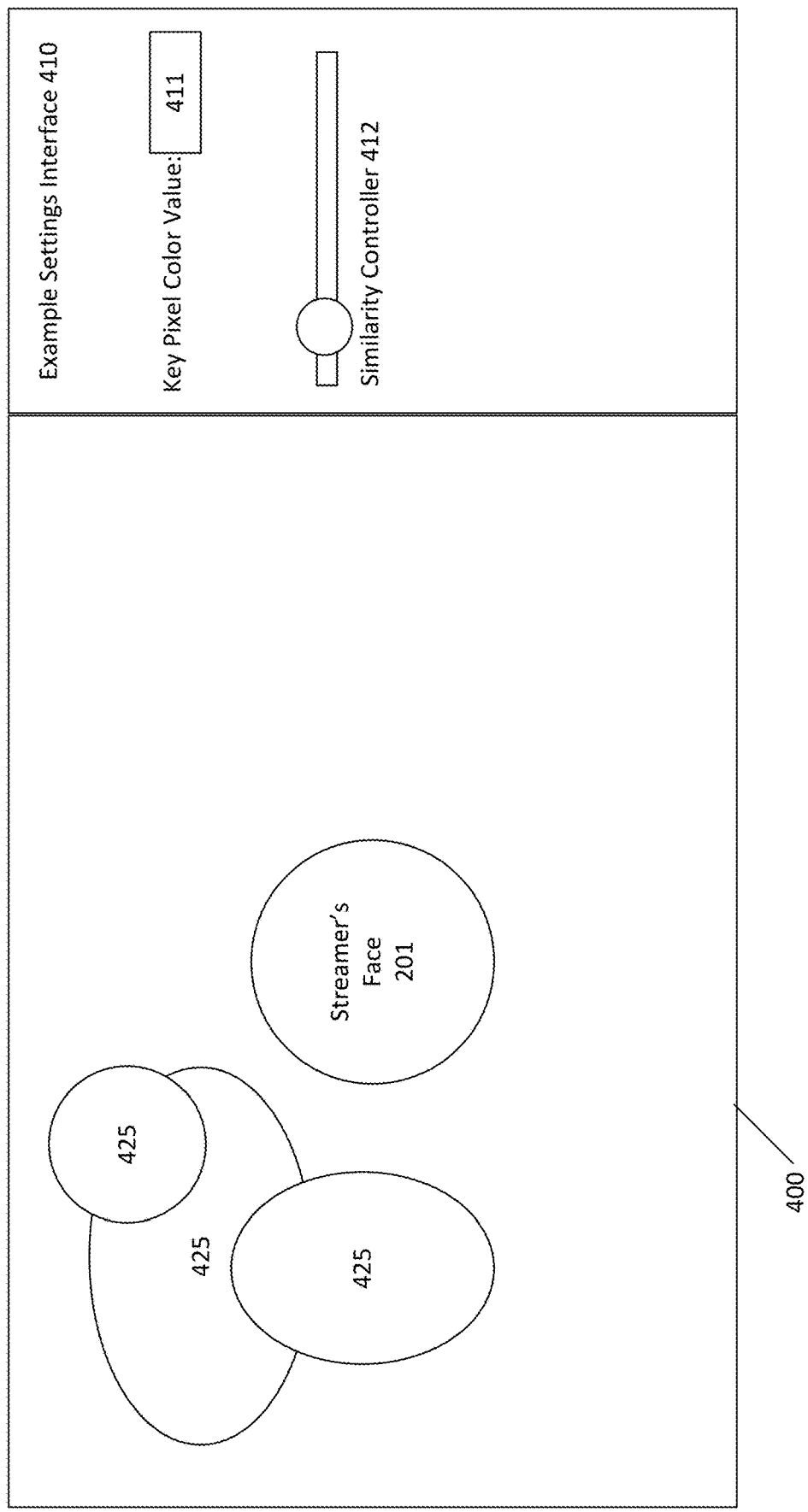
FIG. 4 is a diagram illustrating an example background replacement settings interface that may be used in accordance with the present disclosure.

Referring now to FIG. 4, an example background replacement settings interface will now be described in detail. As shown, FIG. 4 depicts an image 400 in which the background has been detected and replaced. Specifically, it is seen that the uniform-colored background that is actually positioned behind the user in the physical environment 100 (and shown in image 200 of FIG. 2) has been replaced with a superimposed background shown in image 400. As shown, the superimposed background in image 400 includes several superimposed shapes 425 that have been superimposed onto the uniform-colored background by detecting and replacing the uniform-colored background. FIG. 4 also includes an example setting interface 410, such as may be displayed adjacent to the image 400 on a display of a streamer's device. In this example, interface 410 includes a key pixel color value setting indicator 411, which may indicate the key pixel color value 316 of FIG. 3 that is calculated using the techniques described above. In some examples, the indicator 411 may show, by default, a key pixel color value 316 that may be automatically calculated by the setup assistant 112. However, the indicator 411 may also allow the user to edit the key pixel color value 316, such as by typing a different value into the indicator 411 (e.g., using an attached keyboard, etc.). The interface 410 also includes a similarity controller 412, which may indicate (and allow the user to adjust) the threshold that is used to calculate the similarity color range 320. In some examples, the similarity controller 412 may show, by default, a threshold value that is automatically selected by the setup assistant 112. However, the similarity controller 412 may also allow the user to edit the threshold value, such as by sliding the circular indicator left or right along the underlying rectangular slide bar (e.g., using an attached mouse, touchscreen, etc.). It is noted that the settings shown in interface 410 are merely some examples of settings that may be calculated and adjusted in association with the techniques described herein.

FIG. 5 is a flowchart illustrating an example process for smart color-based background replacement that may be used in accordance with the present disclosure. The process of FIG. 5 is initiated at operation 510, at which a streaming application setup assistant (e.g., setup assistant 112 of FIG. 1) receives an image captured by a camera, the image capturing a physical environment that is to be part of a live video stream. As described above, the image may include a streamer standing, or otherwise positioned, in front of a background of the physical environment. At operation 512, a similarity color range of the background of the image is determined, for example by the setup assistant. In the example, of FIG. 5, operation 512 includes sub-operations 512A-F, which will now be described in detail.

At sub-operation 512A, a plurality of pixels is selected from the image, wherein the plurality of pixels represents a proper subset of all pixels included in the image. In some examples, the image may include a first portion and a second portion, and the plurality of pixels may be sampled from the first portion and not the second portion. In one specific example, the first portion of the image may include a right portion of the image (e.g., portion 211B of FIG. 2) and a left portion of the image (e.g., portion 211A of FIG. 2), while the second portion of the image may include a center portion of the image (e.g., portion 212 of FIG. 2). Also, in one specific example, the right portion, the left portion and the center portion of the image may each be equivalently sized. Selecting the plurality of pixels from the right potion and the left portion (and not the center portion) may often be advantageous because the streamer may often be positioned in the center of the image, meaning that the left and right portions are more likely to include the background. In some examples, the plurality of pixels may be selected from the image based on an equal distribution of pixels in the first portion of the image. For example, the plurality of pixels may include equal amounts of pixels from both the right portion and the left portion of the image. As another example, the plurality of pixels may be equally distributed across an area of the first portion (e.g., across areas of each the right portion and the left portion), equidistantly distributed, and/or may otherwise be selected from the image based on an equal distribution of pixels in the first portion of the image. In one specific example, each pixel of the plurality of pixels may be substantially equidistant from each of at least two other pixels in the plurality of pixels.

At sub-operation 512B, a pixel color value is determined for each pixel included in the plurality of pixels. For example, the image that is received from the camera may include, or may otherwise be associated with, data that identifies pixel color values for each of the pixels included in the image, and the pixel color values may be determined based on this color value data. At sub-operation 512C, the plurality of pixels may be grouped, based on the pixel color value for each pixel, into a plurality of pixel groups. In some examples, the pixel color value for a respective pixel of the plurality of pixels that is used for the grouping may be independent of a luminance value for the respective pixel. For example, the pixel color value for a respective pixel of the plurality of pixels that is used for the grouping may include blue chrominance (U) and red chrominance (V) values of a luminance-blue chrominance-red chrominance (YUV) color model. It is noted that, as an alternative or in addition to YUV, other color models may also be employed, such as red-green-blue (RGB), hue-saturation-lightness (HSL), hue-saturation-value (HSV), hue-saturation-intensity (HSI), and others. In some examples, the pixels may be grouped by dividing a graph of pixel color values (e.g., graph 300 of FIG. 3) into a plurality of areas (e.g., areas 301A-I of FIG. 3) representing the plurality of pixel groups. For example, in the case of YUV color, blue chrominance (U) and red chrominance (V) values may be plotted on a graph with one axis (e.g., X-axis 302 of FIG. 3) representing blue chrominance (U) values and another axis (e.g., Y-axis 303 of FIG. 3) representing red chrominance (V) values (with luminance values being discarded as described above). Each pixel may then be included in the pixel group represented by the area in which the pixel's respective pixel value is plotted. Other techniques may also be employed to group the pixels, such as based on one or more clustering algorithms (e.g., centroid-based clustering) and the like.

At sub-operation 512D, a largest pixel group of the plurality of pixel groups may be selected. A key pixel color value may then be selected. The largest pixel group may be selected by calculating the number of pixels in each pixel group, for example based on how many pixels are in included om each area of a pixel value graph. The pixel group with the most pixels may then be selected as the largest pixel group. At sub-operation 512E, A key pixel color value may be calculated that is associated with an average pixel color value of pixels in the largest pixel group. In some examples, the key pixel color value may be the average pixel color value of pixels in the largest pixel group. In other examples, the key pixel color value may otherwise be calculated based on (e.g., as a factor of) the average pixel color value of pixels in the largest pixel group.

At sub-operation 512F, the similarity color range that encompasses a first threshold percentage of the pixels in the largest pixel group may be identified based on the key pixel color value. In some examples, the similarity color range may be identified based on a Euclidean distance from the key pixel color value that encompasses the first threshold percentage of the pixels in the largest pixel group. For example, in the graph of UV color values described above, a point representing the key pixel color value (e.g., key pixel color value 316 of FIG. 3) may form a center point of a circle. The circle may be formed based on (e.g., so that it is just large enough to encompass) the first threshold percentage of the pixels in the largest pixel group. The similarity color range (e.g., similarity color range 320 of FIG. 3) may then include the color values that are represented by the area of the circle within the graph. It is noted that, in addition or as alternative to Euclidean distance, other distance measures may be also be used to determine the similarity color range.

At operation 514, the similarity color range (and in some cases the key pixel color value) may be utilized to configure settings for replacement of the background in the live video stream. For example, the key pixel color value may be used as a color setting and the similarity color range may be used as a similarity setting for performing background replacement. For example, in some cases, each pixel in the image that has a color value within the similarity color range may be considered to be part of the background and may be removed. In some cases, not all pixels within the similarity color range may be removed, such as if they are positioned in an area of an image that has otherwise been determined not to be part of the background.

Thus, the above techniques may be used to configure settings for replacement of the background. In some examples, a user may provide a command or other instructions to trigger an initiation of the background replacement process. It is noted, however, that the techniques described herein may allow the background replacement process to be automatically triggered, without first requiring an explicit user command or instruction to trigger the process. For example, in some cases, the setup assistant may determine, based on a degree of uniformity of the background color, that the user would like the background replacement process to be automatically triggered. In some examples, the setup assistant may examine the size (e.g. number of pixels) in the largest pixel group described above. When the largest pixel group includes at least a second threshold percentage of the subset of sampled pixels, then this may be a strong indication that the background has a substantially uniform color—and that the streamer would like a chroma-keying or other background replacement process to be performed. In one specific example, a threshold percentage of at least fifty percent of the sampled pixels may be selected. In some examples, if the largest pixel group meets or exceeds this threshold percentage, then the setup assistant may automatically trigger performance of a background replacement process—or in some cases may ask the streamer to confirm that he or she would like the background replacement processes to be triggered. Thus, in some cases, the replacement of the background may be performed based, at least in part, on a determination that the largest pixel group includes at least a second threshold percentage of the plurality of pixels in all of the plurality of pixel groups combined.

It is noted that, while some of the above examples include scenarios in which pixels are sampled from the left-side and right-side portions of an image (e.g., portions 211A and 211B of FIG. 2), the techniques described herein may also include examples in which pixels are sampled from a center portion of the image (e.g., portion 212 of FIG. 2). As described above, in some cases, the center portion of an image may be a portion of an image that is most likely to include foreground object such as a streamer's face 201 and/or body. In some examples, sampling the center of the image could be used to identify pixel groups and/or pixel color value ranges that correspond to the image foreground. These pixel color ranges that correspond to the foreground could then be excluded from the color range that is used to determine the image background.

Additionally, in some examples, it is noted that the first threshold that is used to determine the similarity range may be selected based, at least in part, on the portions and/or percentages of the image from which the plurality of pixels are sampled. For example, in some cases, if pixels are sampled from the entire image (as opposed to only being sampled from portions of an image that are particularly likely to include the background), then this may sometimes cause the first threshold to be reduced, for example because the accuracy of the key pixel color value may sometimes be less certain in these cases. By contrast, in some cases, if pixels are sampled only from portions of the image that are particularly likely to include the background, then this may sometimes case the first threshold to be increased, for example because the accuracy of the key pixel color value may sometimes be more certain in these cases.

Figure 6:
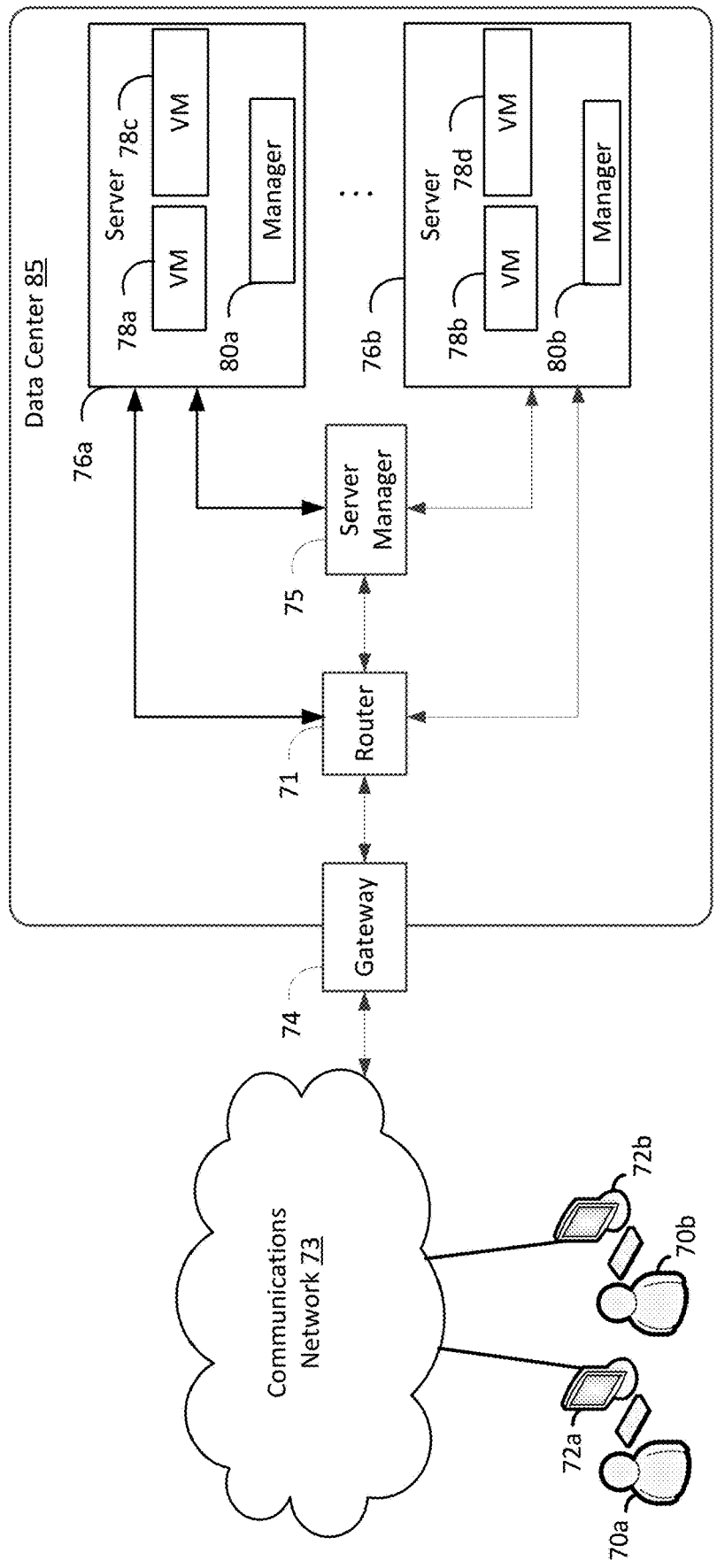
FIG. 6 is a diagram illustrating an example system for transmitting and providing data that may be used in accordance with the present disclosure.

An example system for transmitting and providing data will now be described in detail. In particular, FIG. 6 illustrates an example computing environment in which the embodiments described herein may be implemented. FIG. 6 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
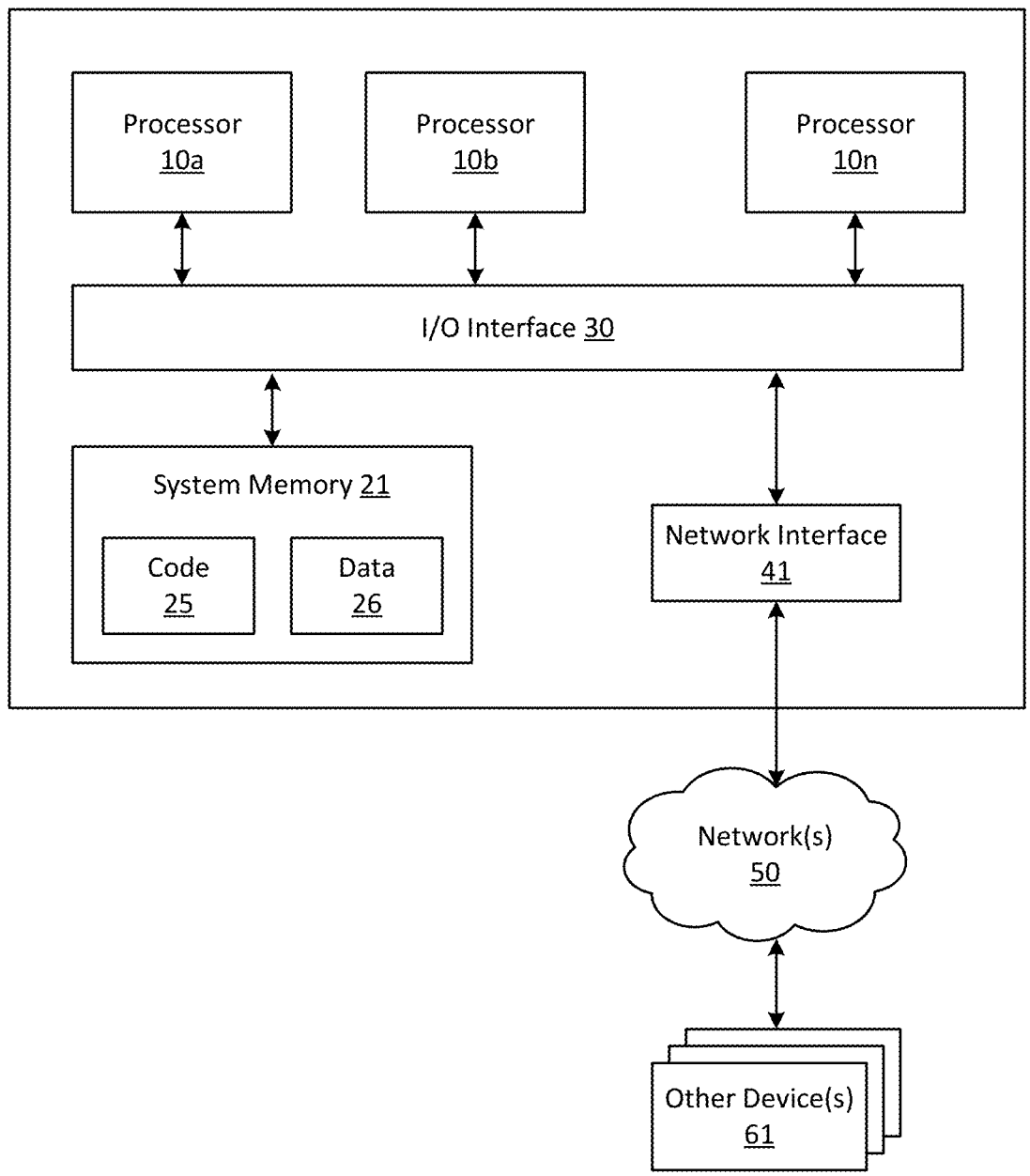
FIG. 7 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 21 via an input/output (I/O) interface 30. Computing device 15 further includes a network interface 41 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 21 may be configured to store instructions and data accessible by processor(s) 10. In various embodiments, system memory 21 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 21 as code 25 and data 26.

In one embodiment, I/O interface 30 may be configured to coordinate I/O traffic between processor 10, system memory 21 and any peripherals in the device, including network interface 41 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 41 may be configured to allow data to be exchanged between computing device 15 and other device or devices 61 attached to a network or networks 50, such as other computer systems or devices, for example. In various embodiments, network interface 41 may support communication via any suitable wired or wireless general data networks, such as types of Ethernet networks, for example. Additionally, network interface 41 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 21 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 21 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving, by a streaming application setup assistant, an image captured by a camera, the image capturing a physical environment that is to be part of a video stream;
determining a similarity color range of a background of the image by:
selecting a plurality of pixels from the image, wherein the plurality of pixels represents a proper subset of all pixels included in the image;
determining a pixel color value for each pixel included in the plurality of pixels;
plotting the pixel color value for each pixel on a color value graph;
grouping, based on the pixel color value for each pixel, the plurality of pixels into a plurality of pixel groups;
selecting a largest pixel group of the plurality of pixel groups;
calculating a key pixel color value that is associated with an average pixel color value of pixels in the largest pixel group; and
identifying, based on a first threshold percentage of pixels in the largest pixel group, the similarity color range, wherein the similarity color range is an area formed around the key pixel color value, within the color value graph, that encompasses the first threshold percentage of the pixels in the largest pixel group, wherein the similarity color range includes pixel values that are within the area; and
utilizing the similarity color range to configure settings for replacement of the background in the video stream.

2. The computing system of claim 1, wherein the image includes a first portion, and a second portion, and wherein the plurality of pixels are selected from the first portion and not the second portion.

3. The computing system of claim 2, wherein the first portion of the image includes a right portion of the image and a left portion of the image and the second portion of the image includes a center portion of the image.

4. The computing system of claim 1, wherein each pixel of the plurality of pixels is substantially equidistant from each of at least two other pixels in the plurality of pixels.

5. A computer-implemented method comprising:
receiving, by a streaming application setup assistant, an image captured by a camera, the image capturing a physical environment that is to be part of a live video stream;
determining a similarity color range of a background of the image by:
determining a pixel color value for each pixel included in a plurality of pixels within the image;
grouping, based on the pixel color value for each pixel, the plurality of pixels into a plurality of pixel groups;
selecting a largest pixel group of the plurality of pixel groups;
calculating a key pixel color value based on pixel color values of pixels in the largest pixel group; and
identifying, based on a first threshold percentage of pixels in the largest pixel group, the similarity color range, wherein the similarity color range is an area formed around the key pixel color value, within a color value graph, that encompasses the first threshold percentage of the pixels in the largest pixel group, wherein the similarity color range includes pixel values that are within the area; and utilizing the similarity color range to configure settings for replacement of the background in the live video stream.

6. The computer-implemented method of claim 5, wherein the image includes a first portion, and a second portion, and wherein the plurality of pixels are selected from the first portion and not the second portion.

7. The computer-implemented method of claim 6, wherein the first portion of the image includes a right portion of the image and a left portion of the image and the second portion of the image includes a center portion of the image.

8. The computer-implemented method of claim 6, further comprising selecting the plurality of pixels from the image based on an equal distribution of pixels in the first portion of the image.

9. The computer-implemented method of claim 5, wherein the key pixel color value is calculated based on an average of the pixel color values in the largest pixel group.

10. The computer-implemented method of claim 5, wherein the grouping comprises dividing a graph of pixel color values into a plurality of areas representing the plurality of pixel groups.

11. The computer-implemented method of claim 5, wherein the grouping is performed based on a clustering algorithm.

12. The computer-implemented method of claim 5, wherein the pixel color value for a respective pixel of the plurality of pixels is independent of a luminance value for the respective pixel.

13. The computer-implemented method of claim 12, wherein the pixel color value for the respective pixel comprises blue chrominance (U) and red chrominance (V) values of a luminance-blue chrominance-red chrominance (YUV) color model.

14. The computer-implemented method of claim 5, wherein the area is associated with a Euclidean distance from the key pixel color value.

15. The computer-implemented method of claim 5, further comprising performing the replacement of the background based, at least in part, on a determination that the largest pixel group includes at least a second threshold percentage of the plurality of pixels in all the plurality of pixel groups combined.

16. One or more non-transitory computer-readable storage media having stored thereon computing instructions that, upon execution by a computing device, cause the computing device to perform operations comprising:

receiving, by a streaming application setup assistant, an image captured by a camera, the image capturing a physical environment that is to be part of a live video stream;

determining a similarity color range of a background of the image by:
   determining a pixel color value for each pixel included in a plurality of pixels within the image;
   grouping, based on the pixel color value for each pixel, the plurality of pixels into a plurality of pixel groups;
   selecting a largest pixel group of the plurality of pixel groups;
   calculating a key pixel color value that based on pixel color values of pixels in the largest pixel group; and
   identifying, based on a first threshold percentage of pixels in the largest pixel group, the similarity color range, wherein the similarity color range is an area formed around the key pixel color value, within a color value graph, that encompasses the first threshold percentage of the pixels in the largest pixel group, wherein the similarity color range includes pixel values that are within the area; and utilizing the similarity color range to configure settings for replacement of the background in the live video stream.

17. The one or more non-transitory computer-readable storage media of claim 16, wherein the grouping comprises dividing a graph of pixel color values into a plurality of areas representing the plurality of pixel groups.

18. The one or more non-transitory computer-readable storage media of claim 16, wherein the pixel color value for a respective pixel of the plurality of pixels is independent of a luminance value for the respective pixel.

19. The one or more non-transitory computer-readable storage media of claim 18, wherein the pixel color value for the respective pixel comprises blue chrominance (U) and red chrominance (V) values of a luminance-blue chrominance-red chrominance (YUV) color model.

20. The one or more non-transitory computer-readable storage media of claim 16, wherein the area is associated with a Euclidean distance from the key pixel color value.

* * * * *